United States Patent
Matsuo et al.

(10) Patent No.: US 10,215,226 B2
(45) Date of Patent: Feb. 26, 2019

(54) HYDRAULIC PUMP

(71) Applicant: KABUSHIKI KAISHA TOYOTA JIDOSHOKKI, Kariya-shi, Aichi (JP)

(72) Inventors: Tsutomu Matsuo, Kariya (JP); Naoya Yokomachi, Kariya (JP); Yuki Ueda, Kariya (JP); Takashi Uno, Kariya (JP)

(73) Assignee: KABUSHIKI KAISHA TOYOTA JIDOSHOKKI, Kariya-shi, Aichi (JP)

( * ) Notice: Subject to any disclaimer, the term of this patent is extended or adjusted under 35 U.S.C. 154(b) by 0 days.

(21) Appl. No.: 15/750,946

(22) PCT Filed: Jul. 28, 2016

(86) PCT No.: PCT/JP2016/072208
§ 371 (c)(1),
(2) Date: Feb. 7, 2018

(87) PCT Pub. No.: WO2017/029963
PCT Pub. Date: Feb. 23, 2017

(65) Prior Publication Data
US 2018/0231055 A1    Aug. 16, 2018

(30) Foreign Application Priority Data
Aug. 20, 2015    (JP) ................. 2015-162783

(51) Int. Cl.
*F16C 25/06* (2006.01)
*F16C 19/36* (2006.01)
(Continued)

(52) U.S. Cl.
CPC .......... *F16C 19/364* (2013.01); *F04B 1/2085* (2013.01); *F16C 19/547* (2013.01); *F16C 25/083* (2013.01); *F16C 2360/42* (2013.01)

(58) Field of Classification Search
CPC .. F16C 19/364; F16C 19/547; F16C 2360/42; F04B 1/2085; F04B 27/1063
See application file for complete search history.

(56) References Cited

U.S. PATENT DOCUMENTS 1,906,464 A * 5/1933 Hapgood ............. F04C 18/344
                                                   384/563
5,233,913 A * 8/1993 Muirhead ................ F01B 3/00
                                                   384/620
(Continued)

FOREIGN PATENT DOCUMENTS

GB        1250409 A    12/1969
JP        60-14616 A    1/1985
(Continued)

OTHER PUBLICATIONS

International Search Report dated Nov. 1, 2016 issued by the International Searching Authority in corresponding application No. PCT/JP2016/072208.
(Continued)

*Primary Examiner* — Phillip A Johnson
(74) *Attorney, Agent, or Firm* — Sughrue Mion, PLLC

(57) ABSTRACT

A hydraulic pump having a rotary shaft rotatably supported with respect to a casing, the hydraulic pump including: a bearing part provided to one end side and the other end side of the rotary shaft; and a first annular member provided around the rotary shaft on at least one side of the one end side and the other end side of the rotary shaft. The bearing part on the one side has a support part which rotatably supports the rotary shaft, and a preload applying member which applies a preload in the axial direction to the support part. The first annular member is interposed between the bearing part of the one side and a receiving part of the rotary
(Continued)

shaft in the axial direction, and an inner diameter of the first annular member is larger than a diameter of the rotary shaft.

4 Claims, 5 Drawing Sheets

(51) Int. Cl.
*F04B 1/20* (2006.01)
*F16C 25/08* (2006.01)
*F16C 19/54* (2006.01)
*F16C 33/36* (2006.01)

(56) References Cited

U.S. PATENT DOCUMENTS

| | | | |
|---|---|---|---|
| 6,244,751 B1* | 6/2001 | Rode | F16C 25/083 29/898.06 |
| 2002/0168126 A1* | 11/2002 | Shimizu | H02K 5/1732 384/517 |
| 2008/0220922 A1 | 9/2008 | Katsuma et al. | |
| 2013/0098200 A1 | 4/2013 | Kurihara | |
| 2014/0169716 A1* | 6/2014 | Kullin | F16C 25/083 384/456 |

FOREIGN PATENT DOCUMENTS

| | | |
|---|---|---|
| JP | 61-25070 U | 2/1986 |
| JP | 4-279775 A | 10/1992 |
| JP | 5-74166 U | 10/1993 |
| JP | 2005-207310 A | 8/2005 |
| JP | 2008-213098 A | 9/2008 |
| WO | 2012/008438 A1 | 1/2012 |

OTHER PUBLICATIONS

Communication dated May 8, 2018, from the European Patent Office in counterpart European Application No. 16836954.4.
International Preliminary Report on Patentability dated Mar. 1, 2018, in counterpart International Application No. PCT/JP2016/072208.

* cited by examiner

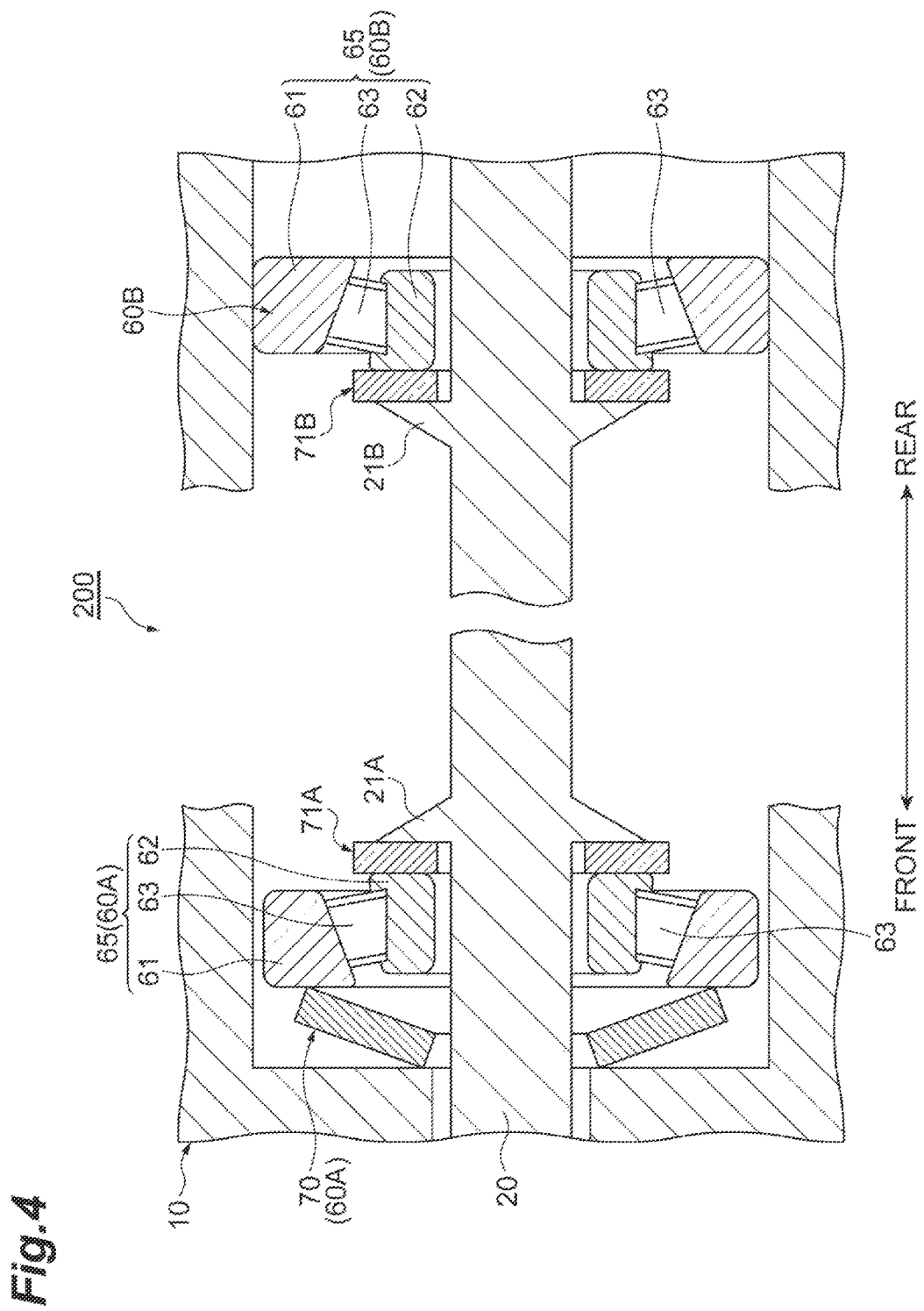

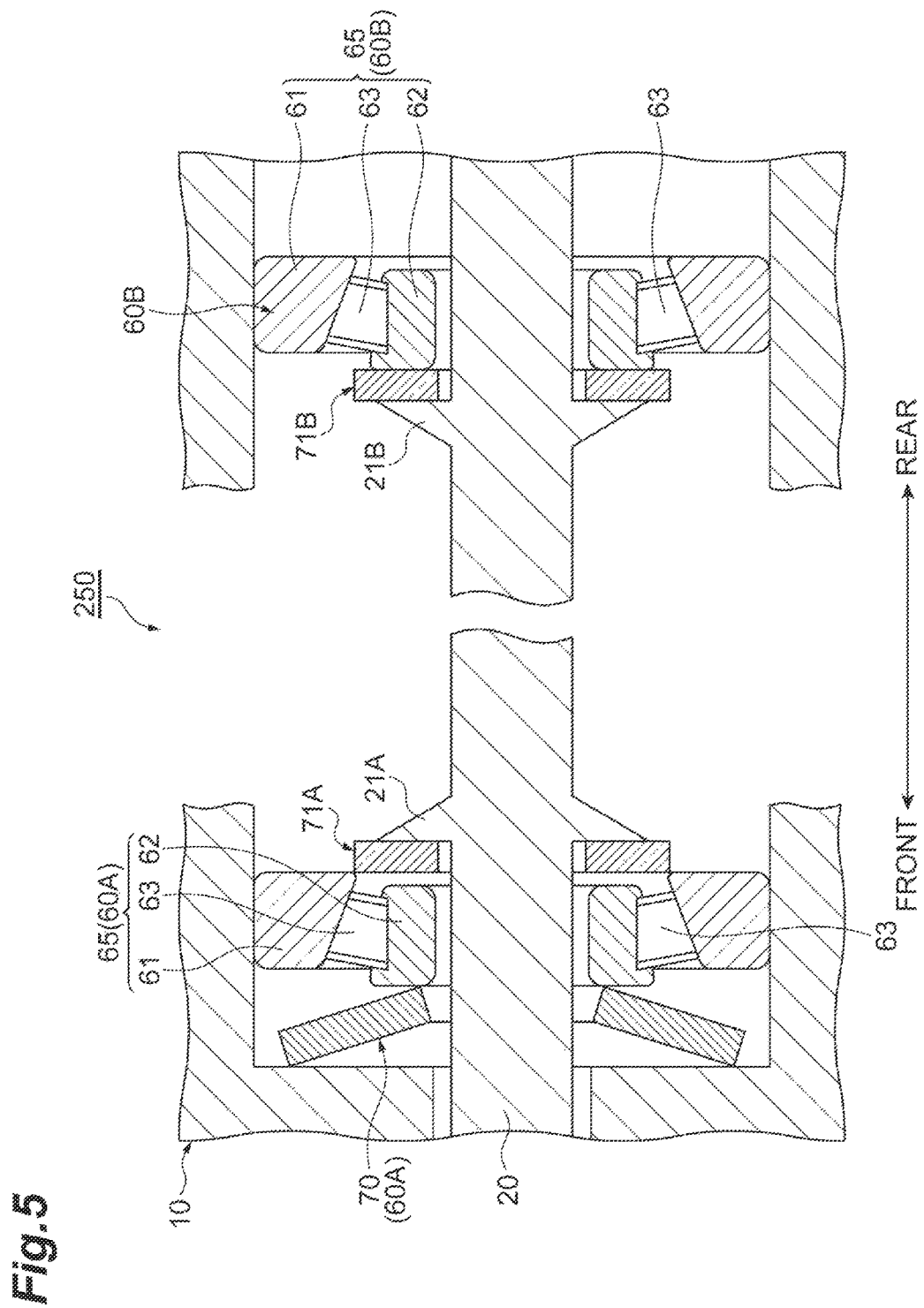

HYDRAULIC PUMP

CROSS REFERENCE TO RELATED APPLICATIONS

This application is a National Stage of International Application No. PCT/JP2016/072208 filed Jul. 28, 2016, claiming priority based on Japanese Patent Application No. 2015-162783 filed Aug. 20, 2015, the contents of all of which are incorporated herein by reference in their entirety.

TECHNICAL FIELD

The present invention relates to a hydraulic pump having a bearing structure.

BACKGROUND ART

In the related art, as a hydraulic pump, a variable displacement pump in which a discharge amount of a pump is made variable by changing an inclination angle of a swash plate has been known. For example, the following Patent Literature 1 discloses a variable displacement pump which includes a rotary shaft, and a cylinder block connected to the rotary shaft to integrally rotate, and has pistons housed to be reciprocally movable in a plurality of bores formed in the cylinder block. Further, in the variable displacement pump described in Patent Literature 1, the rotary shaft is supported with respect to a casing via a pair of tapered roller bearings. In such a variable displacement pump, in order to ensure the bearing life expectancy of the tapered roller bearing which supports the rotary shaft, usually a preload applying member such as a disc spring is inserted between a receiving part of the shaft and the bearing, thus applying preload to the tapered roller bearing.

CITATION LIST

Patent Literature

Patent Literature 1: Japanese Unexamined Patent Publication No. H4-279775

SUMMARY OF INVENTION

Technical Problem

Here, in the hydraulic pump having the aforementioned bearing structure, there is a problem of wear on the preload applying member due to the high-speed rotation of a counterpart member with which the preload applying member comes into contact with high-speed rotation of the rotary shaft. Therefore, in the hydraulic pump, a bearing structure capable of applying an appropriate preload to the bearing part, while suppressing wear on the preload applying member, has been required.

An object of the present invention is to provide a hydraulic pump including a bearing structure capable of applying an appropriate preload to a bearing part, while suppressing wear on the preload applying member.

Solution to Problem

A hydraulic pump according to an aspect of the present invention is a hydraulic pump having a rotary shaft rotatably supported with respect to a casing, the hydraulic pump including: a hearing part provided to one end side and the other end side of the rotary shaft; and a first annular member provided around the rotary shaft on at least one side of the one end side and the other end side of the rotary shaft, the bearing part on the one side has a support part which rotatably supports the rotary shaft, and a preload applying member which applies a preload in the axial direction to the support part, the first annular member is interposed between the bearing part of the one side and a receiving part of the rotary shaft in the axial direction, and an inner diameter of the first annular member is larger than a diameter of the rotary shaft.

The hydraulic pump includes a bearing part which has a support part that rotatably supports the rotary shaft, and a preload applying member that applies a preload in the axial direction to the support part. Further, in the axial direction, the first annular member is interposed between the bearing part and the rotary shaft. Thus, the first annular member is configured to be disposed between the bearing part having the preload applying member and the rotary shaft rotating at high speed. With the interposition of the first annular member, high-speed rotation of the preload applying member of the bearing part or the support part with the high-speed rotation of the rotary shaft is suppressed. Therefore, it is possible to suppress wear on the preload applying member due to friction between the preload applying member and a counterpart member. As described above, it is possible to appropriately apply the preload to the bearing part, while suppressing the wear on the preload applying member.

In the hydraulic pump according to another aspect of the present invention, the support part has an inner race attached to the rotary shaft, an outer race attached to the housing, and a rolling element disposed between the inner race and the outer race, the preload applying member is interposed between the support part and the first annular member in the axial direction, and among the inner race and the outer race, a member on a side against which the preload applying member abuts may be attached to the rotary shaft or the housing by a clearance fit. With such a configuration, the preload can apply the preload by abutting against the inner race or the outer race of the support part. Further, the high-speed rotation of the preload applying member associated with the high-speed rotation of the rotary shaft is suppressed by the interposition of the annular member.

In the hydraulic pump according to another aspect of the present invention, the support part has an inner race attached to the rotary shaft, an outer race attached to the housing, and a rolling element disposed between the inner race and the outer race, the support part is interposed between the preload applying member and the annular member in the axial direction, and among the inner race and the outer race, a member on a side against which the preload applying member abuts may be attached to the rotary shaft or the housing by a clearance fit. With such a configuration, the preload applying member can apply the preload by abutting against the inner race or the outer race of the support part. Further, the high-speed rotation of the support part associated with the high-speed rotation of the rotary shaft is suppressed by the interposition of the annular member. In addition, in such a configuration, since the support part is interposed between the preload applying member and the rotary shaft in addition to the annular member, the high-speed rotation of the preload applying member is further suppressed. Accordingly, wear on the preload applying member can be further suppressed.

The hydraulic pump according to another aspect of the present invention may further include a second annular member which is provided around the rotary shaft and is opposed to the bearing part in the axial direction, on the other side of the one end side and the other end side of the rotary shaft. With such a configuration, it is possible to suppress high-speed rotation of the bearing part on the other side.

Advantageous Effects of Invention

According to the present invention, it is possible to apply an appropriate preload to the bearing part, while suppressing wear on the preload applying member.

BRIEF DESCRIPTION OF DRAWINGS

FIG. 4 is a schematic enlarged view of both end sides of a rotary shaft of a hydraulic pump according to a modified example.

FIG. 5 is a schematic enlarged view of both end sides of a rotary shaft of a hydraulic pump according to a modified example.

DESCRIPTION OF EMBODIMENTS

Figure 1:
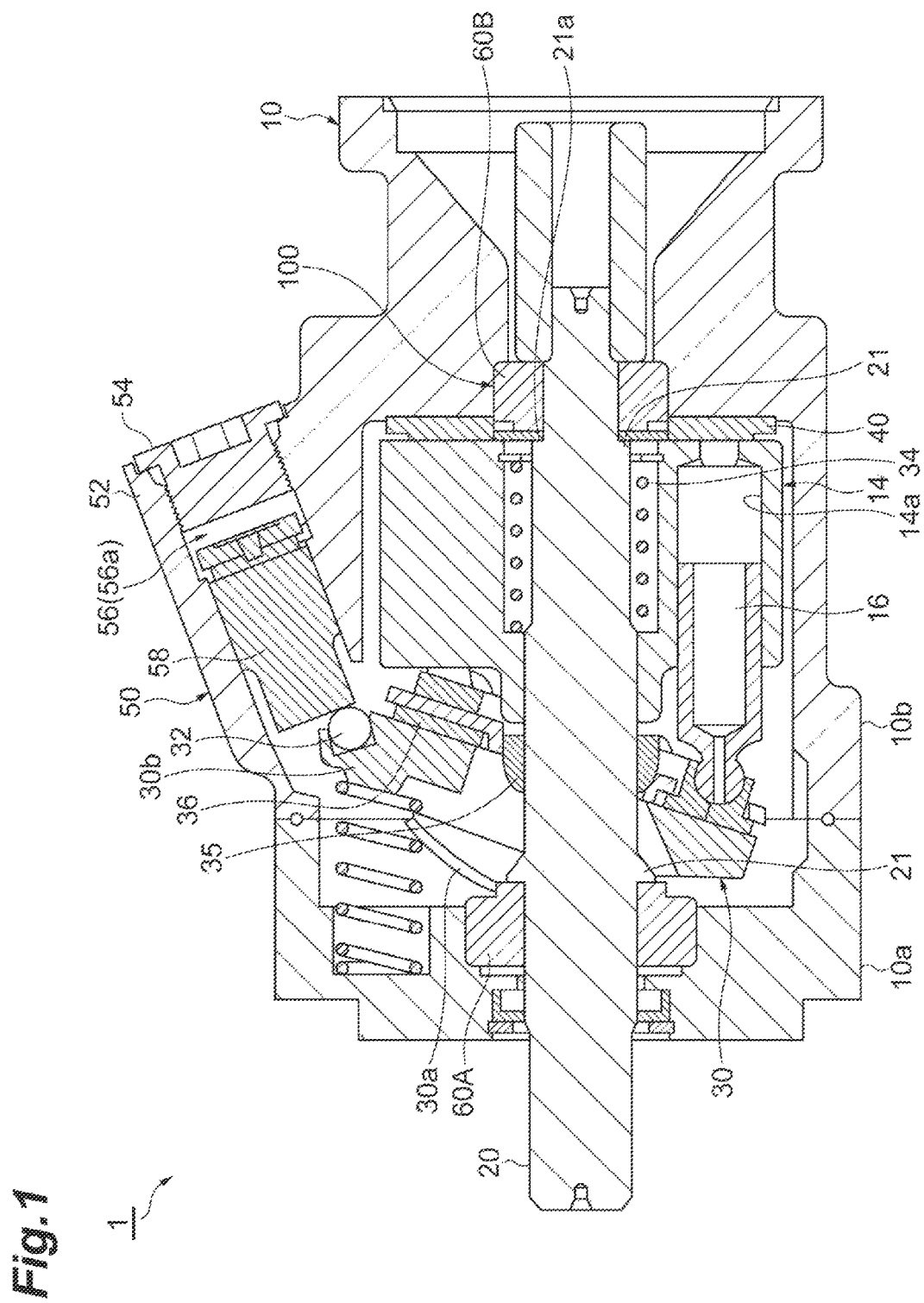
FIG. 1 is a schematic cross-sectional view illustrating a hydraulic pump according to an embodiment of the present invention.

Hereinafter, embodiments for carrying out the present invention will be described in detail with reference to the accompanying drawings. The same or equivalent elements are denoted by the same reference numerals, and the description thereof will not be provided when the description is repeated.

First, a configuration of a hydraulic pump according to the present embodiment will be described. As an example of a hydraulic pump, a variable displacement type piston pump (hereinafter simply referred to as a hydraulic pump) 1 will be described with reference to FIG. 1.

The hydraulic pump 1 includes a pump housing 10 (casing), a rotary shaft 20 rotatably supported by the pump housing 10 and having a protruding end portion protruding from the pump housing 10, a cylinder block 14 which has a plurality of cylinder bores 14a and rotates integrally with the rotary shaft 20, a piston 16 slidably provided in each of a plurality of cylinder bores 14a, and a swash plate 30 which is supported to be tiltable with respect to the rotary shaft 20, and with which a tip end portion of the piston 16 can come into slide-contact. In the hydraulic pump 1, the piston 16 reciprocates at a stroke according to the inclination angle of the swash plate 30 to suck and discharge the working fluid.

The pump housing 10 includes a front housing 10a and a main housing 10b, and both members are integrally formed by screw members (not illustrated).

The rotary shaft 20 having one end portion and the other end portion rotatably supported by bearing parts 60A and 60B is attached to the pump housing 10. A protruding end portion of the rotary shaft 20 from the pump housing 10 is connected to a power take-off device (not illustrated) such as an engine or a motor. The rotary shaft 20 rotates with driving of the power take-off device.

Inside the pump housing 10, a cylinder block 14 spline-fitted to the rotary shaft 20 to be integrally rotatable is housed. In the cylinder block 14, a plurality of cylinder bores 14a disposed at a predetermined interval in the peripheral direction of the rotary shaft 20 is formed. The piston 16 is slidably inserted into each cylinder bore 14a. Shoes are attached to a head portion, which is one end portion (a left end portion in FIG. 1) of each piston 16, and the plurality of shoes is collectively held by the retainer plate 36.

Further, a swash plate 30 is housed on the side of the front housing 10a inside the pump housing 10, and the swash plate 30 is rotatably supported via a swash plate bearing 30a and swingable in the axial direction of the rotary shaft 20. The urging force of the spring member 34 provided between the cylinder block 14 and the rotary shaft 20 is transmitted to a retainer plate 36 via a pivot 35. As a result, the retainer plate 36 is pressed against the swash plate 30 side, and each piston 16 is slidably brought into contact with the swash plate 30 via the shoe. Further, the cylinder block 14 is pressed against a valve plate 40 fixed to an inner end wall surface of the main housing 10b on the side opposite to the front housing 10a.

Further, as the cylinder block 14 integrally rotates with the rotary shaft 20, each piston 16 reciprocates at a stroke defined by the inclination angle of the swash plate 30. Further, the cylinder bore 14a alternately communicates with an arcuate intake port (not illustrated) and a discharge port (not illustrated) which are provided in the valve plate 40. As a result, the working fluid is sucked into the cylinder bore 14a from the intake port, and the working fluid in the cylinder bore 14a is discharged from the discharge port by a pump operation. The intake passage (not illustrated) and a discharge passage (not illustrated) are formed in the wall portion on the other end side of the main housing 10b, and communicate with the intake port and the discharge port, respectively.

The hydraulic pump 1 further includes a control piston 50. The control piston 50 is housed in a housing 52 provided on a side portion of the main housing 10b of the pump housing 10.

The housing 52 of the control piston 50 has a substantially cylindrical shape extending in a direction inclined with respect to the rotary shaft 20 and extending toward the edge portion of the swash plate 30.

Among the openings of the housing 52, the opening farther from the swash plate 30 is closed by a screw 54. Accordingly, a piston storage chamber 56 is defined in the housing 52, and a piston part 58 is housed in the piston storage chamber 56. In the piston storage chamber 56, a space between the piston part 58 and the screw 54 functions as a control chamber 56a into which hydraulic oil flows.

The piston part 58 has a columnar outer shape, and its diameter is designed such that there is no gap between the piston part 58 and the inner wall surface of the piston storage chamber 56 and the piston part 58 can slide in the piston storage chamber 56.

In the control piston 50, by controlling the working fluid to the control chamber 56a, the piston part 58 can reciprocate in the direction of the swash plate 30. When the piston part 58 presses a ball 32 provided on the edge portion 30b of the swash plate 30, the inclination angle of the swash plate 30 is changed, and as a result, the discharge capacity of the hydraulic pump 1 is changed.

Figure 2:
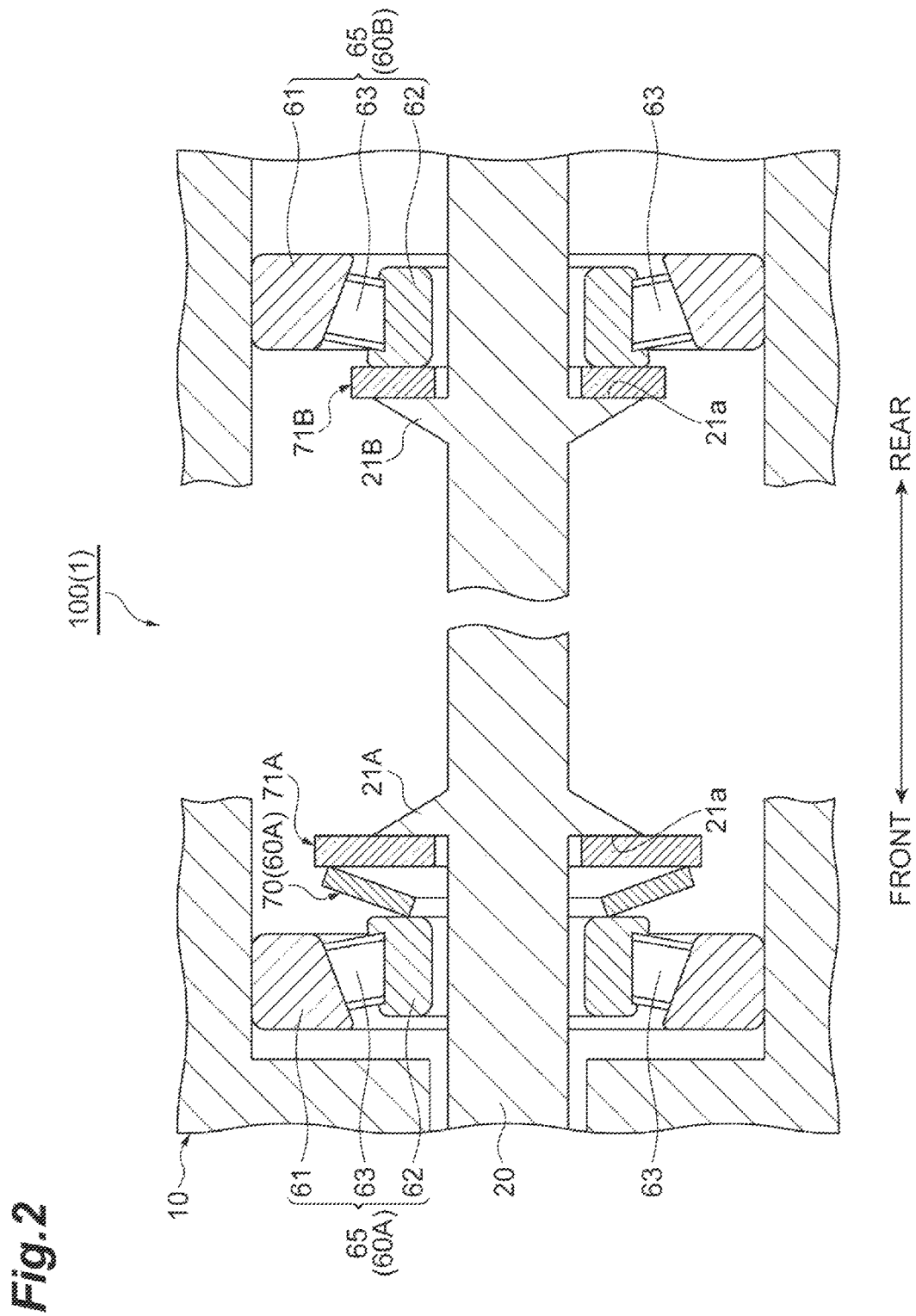
FIG. 2 is a schematic enlarged view of both end sides of a rotary shaft.

FIG. 2 is a schematic enlarged view illustrating the structure of both end sides of the rotary shaft 20. In FIG. 2, the following description will be made assuming that the left side of the sheet corresponds to "front" and the right side of the sheet corresponds to "back".

Next, referring to FIG. 2, the bearing structure 100 of the hydraulic pump 1 will be described. The bearing structure 100 includes bearing parts 60A and 60B provided to the front end side (one end side) and the rear end side (other end side) of the rotary shaft 20, a first annular member 71A provided around the rotary shaft 20 on the front end side of the rotary shaft 20 and axially opposed to the bearing part 60A, and a second annular member 71B provided around the rotary shaft 20 on the rear end side of the rotary shaft 20 and axially opposed to the bearing part 60B. On the rotary shaft 20, receiving parts 21A and 21B which expand to protrude in the peripheral direction are formed on the front end side and the rear end side.

Further, the bearing part 60A on the front end side has a support part 65 that rotatably supports the rotary shaft 20, and a preload applying member 70 that applies a preload in the axial direction to the support part 65. The bearing part 60B on the rear end side has only a support part 65 that rotatably supports the rotary shaft 20. As the support part 65 of the bearing parts 60A and 60B, it is possible to use various bearings capable of improving the service life by applying the preload. For example, rolling bearings such as tapered roller bearings and ball bearings can be adopted as the support part 65. In this embodiment, a tapered roller bearing is adopted.

On the front end side, the support part 65 of the bearing part 60A, the preload applying member 70 of the bearing part 60A, the first annular member 71A, and the receiving part 21A are provided sequentially from the front toward the rear in the axial direction. Thus, in the axial direction, the first annular member 71A is disposed to be interposed between the bearing part 60A and the rotary shaft 20. In the axial direction, the preload applying member 70 is disposed to be interposed between the support part 65 and the first annular member 71A. Further, at the rear end side, the support part 65 of the bearing part 60B, the second annular member 71B, and the receiving part 21B are provided sequentially from the rear toward the front in the axial direction. Thus, in the axial direction, the second annular member 71B is disposed to be interposed between the bearing part 60B and the rotary shaft 20.

Next, each constituent element will be described in detail. The receiving part 21A on the front end side has a receiving surface 21a on the front side, and the receiving part 21B on the rear end side has a receiving surface 21a on the rear side. Further, these receiving surfaces 21a are surfaces that expand perpendicularly to the axial direction. However, the configuration of the receiving parts 21A and 21B is not particularly limited, and any configuration may be adopted as long as the receiving surface 21a can be formed. For example, a stepped portion with the diameter of the rotary shaft 20 changed may be adopted as the receiving surface 21a. Chromium molybdenum steel or the like is adopted as the material of the rotary shaft 20 and the receiving parts 21A and 21B.

The first annular member 71A on the front end side is a disk-shaped member having a through-hole at the center, and is constituted by a ring washer or the like. The first annular member 71A is attached on the receiving surface 21a of the receiving part 21A. That is, the first annular member 71A is disposed on the side closer to the front end than the receiving part 21A, and is disposed so that the end surface of the first annular member 71A comes into contact with the receiving surface 21a. The first annular member 71A is attached to be freely rotatable with respect to the rotary shaft 20. That is, the inner diameter (the diameter of the through-hole) of the first annular member 71A is set to be larger than the diameter of the rotary shaft 20. In other words, the first annular member 71A is externally fitted to the rotary shaft 20 by a clearance fit. In FIG. 2, the outer diameter (the diameter of the first annular member 71A) of the first annular member 71A is set to be larger than the receiving surface 21a, but is not particularly limited.

The second annular member 71B on the rear end side is a disk-shaped member having a through-hole at the center, and is constituted by a ring washer or the like. The second annular member 71B is attached on the receiving surface 21a of the receiving part 21B. That is, the second annular member 71B is disposed on the side closer to the rear end side than the receiving part 21B, and is disposed so that the front end surface of the second annular member 71B comes into contact with the receiving surface 21a. The second annular member 71B is attached to be freely rotatable with respect to the rotary shaft 20. That is, the inner diameter (the diameter of the through-hole) of the second annular member 71B is set to be larger than the diameter of the rotary shaft 20. In other words, the second annular member 71B is externally fitted to the rotary shaft 20 by a clearance fit. In FIG. 2, the outer diameter of the second annular member 71B (the diameter of the second annular member 71B) is set to be larger than the receiving surface 21a, but it is not particularly limited. As the material of the annular members 71A and 71B, in order to ensure wear resistance, a surface treatment or the like of a phosphate film is adopted. The hardness of the annular members 71A and 71B may be set to HRC 40 to 60. The weight of the annular members 71A and 71B may be set to 20 to 100 grams. The outer diameter of the annular members 71A and 71B may be set to 30 mm to 50 mm, and the thickness may be set to 2 mm to 5 mm.

The bearing part 60A on the front end side is disposed at a position spaced forward from the receiving surface 21a of the receiving part 21A. The support part 65 includes an annular outer race 61 disposed on the housing 10 side, an annular inner race 62 disposed on the side of the rotary shaft 20, and a rolling element 63 arranged between the outer race 61 and the inner race 62. A tapered roller bearing is adopted as the support part 65 illustrated in FIG. 2. A rolling surface (that is, an outer peripheral surface) of the inner race 62 and a rolling surface (that is, an inner peripheral surface) of the outer race 61 are provided in a conically inclined state so as to be tapered toward the front. In the present embodiment, the inner race 62 is attached to the rotary shaft 20 by a clearance fit. Further, in the present embodiment, the outer race 61 is attached to the housing 10 by interference fit. For example, the outer race 61 is attached to the housing 10 by press-fitting the outer race 61 into the housing 10. As the material of the support part 65, for example, high carbon chromium steel or the like is adopted.

The preload applying member 70 of the bearing part 60A is made up of an elastic member capable of applying a preload to the support part 65 by being interposed between the support part 65 and the first annular member 71A. In the present embodiment, for example, an annular disc spring having a through-hole at the center position is used. The preload applying member 70 is attached to the rotary shaft 20 by a clearance fit. The front end portion (inner peripheral edge) of the preload applying member 70 is in contact with the end surface of the inner race 62 of the support part 65. The outer diameter of the preload applying member 70 is set to be smaller than that of the first annular member 71A, and the rear end portion (outer peripheral edge) of the preload applying member 70 is in contact with the first annular member 71A. Further, as a material of the preload applying member 70, a carbon tool steel or the like may be adopted in order to ensure wear resistance. The hardness of the preload applying member 70 may be set to HV 200 to 300.

Further, the weight of the preload applying member 70 may be set to 10 to 30 grams. The outer diameter of the preload applying member 70 may be set to 30 to 50 mm and the thickness may be set to 1.5 to 3 mm.

The bearing part 60B on the rear end side is disposed at a position spaced rearward from the receiving surface 21a of the receiving part 21B. The support part 65 is disposed above the receiving surface 21a. The support part 65 includes an annular outer race 61 disposed on the housing 10 side, an annular inner race 62 disposed on the rotary shaft 20 side, and a rolling element 63 disposed between the outer race 61 and the inner race 62. In the present embodiment, the inner race 62 may be attached to the rotary shaft 20 by a clearance fit. That is, a slight gap may be provided between the inner peripheral surface of the inner race 62 and the outer peripheral surface of the rotary shaft 20. Alternatively, the inner race 62 may be attached to the rotary shaft 20 by an interference fit. The outer race 61 may be attached to the housing 10 by an interference fit. That is, the outer race 61 may be attached without any gap by being press-fitted into the housing 10. However, the outer race 61 may be provided by a clearance fit with respect to the rotary shaft 21. As the material of the support part 65, for example, high carbon chromium steel or the like is adopted.

A state of applying the preload in the bearing structure 100 of the hydraulic pump 1 configured as described above will be described. The preload applying member 70 is interposed between the inner race 62 of the support part 65 and the first annular member 71A in the axial direction. Accordingly, in a state in which the preload applying member 70 is supported by the receiving part 21A via the first annular member 71A, the preload applying member 70 pushes the inner race 62 of the support part 65 toward the front. As a result, preload is applied to the inner race 62 and the outer race 61 in the bearing part 60A.

Further, the preload applying member 70 presses the receiving part 21A rearward. Accordingly, the preload applying member 70 presses the inner race 62 of the support part 65 on the rear end side toward the rear via the rotary shaft 20, the receiving part 21B, and the second annular member 71B. As a result, preload is applied to the inner race 62 and the outer race 61 in the bearing part 60B.

Next, the operation and effect of the hydraulic pump 1 according to the present embodiment will be described.

The hydraulic pump 1 according to the present embodiment includes a bearing part 60A which has a support part 65 that rotatably supports the rotary shaft 20, and a preload applying member 70 that applies a preload in the axial direction to the support part 65. Further, in the axial direction, the first annular member 71A is interposed between the bearing part 60A and the rotary shaft 20. Thus, the first annular member 71A is configured to be disposed between the bearing part 60A having the preload applying member 70 and the rotary shaft 20 rotating at a high speed. With the interposition of the first annular member 71A, high-speed rotation of the preload applying member 70 of the bearing part 60A or the support part 65 with the high-speed rotation of the rotary shaft 20 is suppressed. Therefore, it is possible to suppress wear on the preload applying member 70 due to friction between the preload applying member 70 and the counterpart member. As described above, it is possible to appropriately apply the preload to the bearing part 60A, while suppressing the wear on the preload applying member 70.

Further, in the hydraulic pump 1 according to the present embodiment, the support part 65 has the inner race 62 attached to the rotary shaft 20, the outer race 61 attached to the housing 10, and the rolling element 63 disposed between the inner race 62 and the outer race 61. Further, in the axial direction, the preload applying member 70 is interposed between the inner race 62 of the support part 65 and the first annular member 71A. Among the inner race 62 and the outer race 61, the inner race 62 which is a member on the side against which the preload applying member 70 abuts is attached to the rotary shaft 20 by a clearance fit. With such a configuration, the preload applying member 70 can apply the preload by abutting against the inner race 62 of the support part 65. Further, the high-speed rotation of the preload applying member 70 associated with the high-speed rotation of the rotary shaft 20 is suppressed by the interposition of the first annular member 71A. If the receiving part 21A of the rotary shaft 20 and the preload applying member 70 are in direct contact with each other, the preload applying member 70 rotates at a high speed with the rotation of the rotary shaft 20. As a result, the preload applying member 70 is worn by friction between the support part 65 and the preload applying member 70. On the other hand, in the present embodiment, the first annular member 71A is in direct contact with the receiving part 21A, and the preload applying member 70 is in contact with the first annular member 71A. Therefore, by disposing the first annular member 71A which is freely rotatable with respect to the rotary shaft 20, the rotation of the rotary shaft 20 is suppressed from being transmitted to the preload applying member 70 as it is. That is, although the first annular member 71A coming into contact with the receiving part 21A due to the high-speed rotation of the rotary shaft 20 rotates together, the number of revolutions of the first annular member 71A is suppressed as compared with the number of revolutions of the rotary shaft 20. Therefore, the number of revolutions of the preload applying member 70 coming into contact with the first annular member 71A is also suppressed as compared with the number of revolutions of the rotary shaft 20. As a result, it is possible to suppress wear on the preload applying member 70 due to friction between the preload applying member 70 and the counterpart member coming into contact with the preload applying member 70.

Further, the bearing structure 100 according to the present embodiment further includes a second annular member 71B attached to the periphery of the rotary shaft 20 and axially opposed to the bearing part 60B, on the rear end side of the rotary shaft 20. With such a configuration, high-speed rotation of the bearing part 60B on the other side can be suppressed.

Although the preferred embodiment of the bearing structure according to the present invention has been described above, the present invention is not limited to the above embodiment.

For example, in the aforementioned embodiment, the preload applying member 70 came into contact with the inner race 62. Instead of this, as in the hydraulic pump 150 illustrated in FIG. 3, a structure in which the preload applying member 70 abuts against the outer race 61 may be adopted. In this case, the outer race 61 of the support part 65 is attached to the housing 10 by a clearance fit. As a result, the preload applying member 70 presses the outer race 61 toward the front, while being supported by the receiving part 21A of the rotary shaft 20 via the first annular member 71A. Accordingly, a preload is applied to the outer race 61 and the inner race 62.

Figure 3:
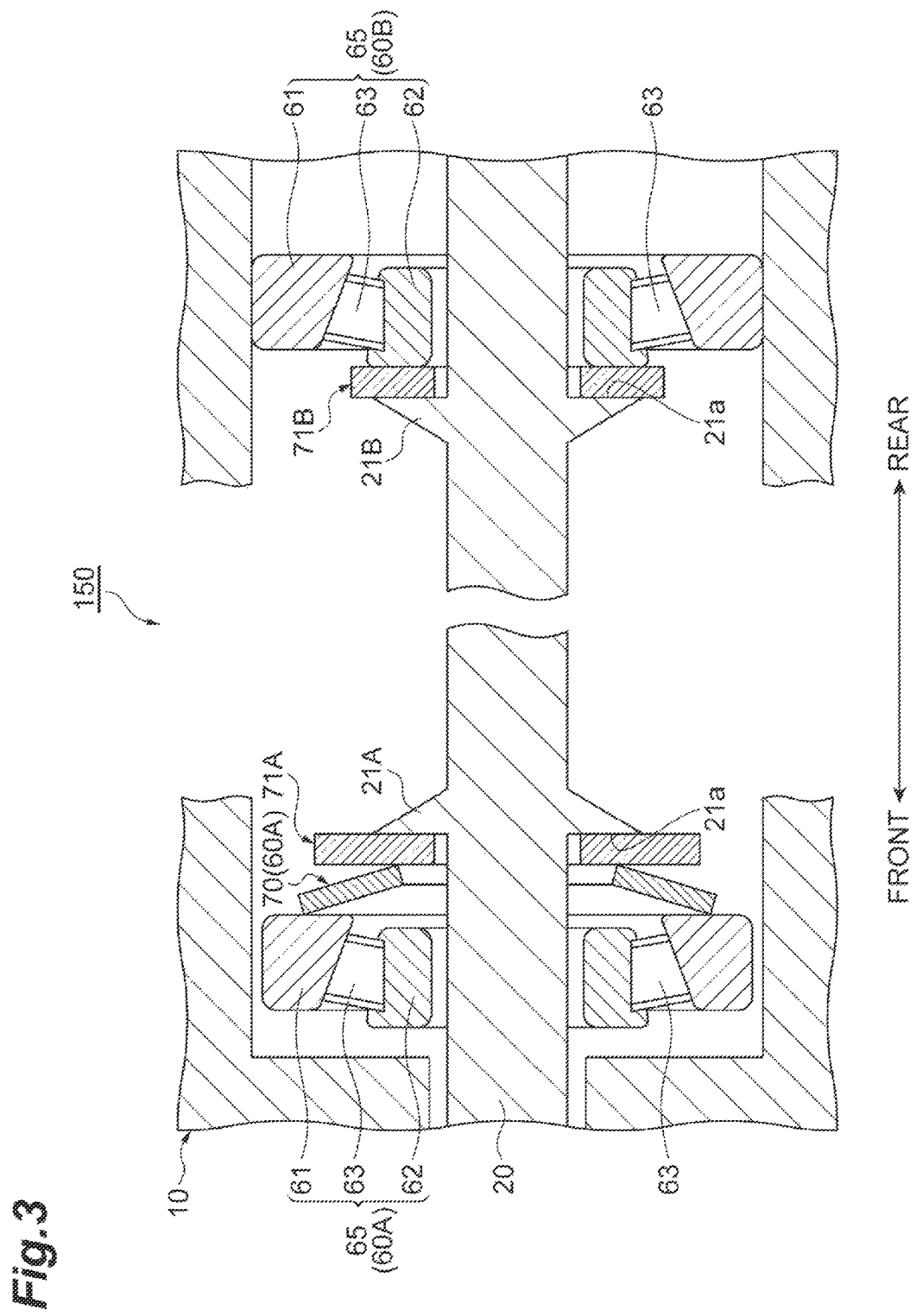
FIG. 3 is a schematic enlarged view of both end sides of a rotary shaft of a hydraulic pump according to a modified example.

In the hydraulic pump 150 according to the modified example illustrated in FIG. 3, the preload applying member 70 is interposed between the outer race 61 of the support part 65 and the first annular member 71A in the axial direction. Among the inner race 62 and the outer race 61, the outer race 61, which is a member on the side against which the preload applying member 70 abuts, is attached to the housing 10 by a clearance fit. With such a configuration, the preload applying member 70 can apply the preload by abutting against the outer race 61 of the support part 65. Further, the high-speed rotation of the preload applying member 70 associated with the high-speed rotation of the rotary shaft 20 is suppressed by the interposition of the first annular member 71A. The first annular member 71A is in direct contact with the receiving part 21A, and the preload applying member 70 is in contact with the first annular member 71A. Therefore, by the first annular member 71A that is freely rotatable with respect to the rotary shaft 20, the rotation of the rotary shaft 20 is suppressed from being transmitted to the preload applying member 70 as it is. That is, although the first annular member 71A coming into contact with the receiving part 21A in association with the high-speed rotation of the rotary shaft 20 rotates together, the number of revolutions of the first annular member 71A is suppressed as compared with the number of revolutions of the rotary shaft 20. Therefore, the number of revolutions of the preload applying member 70 coming into contact with the first annular member 71A is also suppressed as compared with the number of revolutions of the rotary shaft 20. As a result, it is possible to suppress wear on the preload applying member 70 due to friction between the preload applying member 70 and a counterpart member coming into contact with the preload applying member 70.

Further, for example, in the embodiment illustrated in FIG. 2, the preload applying member 70 was interposed between the support part 65 and the first annular member 71A. Alternatively, a hydraulic pump 200 as illustrated in FIG. 4 may be adopted. In the hydraulic pump 200, the support part 65 is interposed between the preload applying member 70 and the first annular member 71A in the axial direction. That is, the preload applying member 70 is disposed on the front side of the support part 65. The front end (inner peripheral edge) of the preload applying member 70 abuts against the housing 10, and the rear end (outer peripheral edge) of the preload applying member 70 abuts against the outer race 61 of the support part 65. In the hydraulic pump 200, among the inner race 62 and the outer race 61, the outer race 61, which is a member on the side against which the preload applying member 70 abuts, may be attached to the housing 10 with a clearance fit. As a result, the preload applying member 70 presses the outer race 61 toward the rear, while being supported by the housing 10. Accordingly, a preload is applied to the outer race 61 and the inner race 62.

In the hydraulic pump 200 according to the modified example illustrated in FIG. 4, the preload applying member 70 can apply the preload by abutting against the outer race 61 of the support part 65. Further, the high-speed rotation of the support part 65 which is a counterpart member of the preload applying member 70 associated with the rotary shaft 20 is suppressed by the interposition of the first annular member 71A. In addition, in such a configuration, since the support part 65 is interposed between the preload applying member 70 and the rotary shaft 20 in addition to the first annular member 71A, the rotation of the rotary shaft 20 is suppressed from being transmitted to the preload applying member 70 as it is. The first annular member 71A coming into contact with the receiving part 21A with the high-speed rotation of the rotary shaft 20 and the support part 65 coming into contact with the first annular member 71A rotate together, but the number of revolutions of the rotation is suppressed as compared with the number of revolutions of the rotary shaft 20. Therefore, the number of revolutions of the preload applying member 70 coming into contact with the support part 65 is also suppressed as compared with the number of revolutions of the rotary shaft 20. As a result, it is possible to suppress wear on the preload applying member 70 due to friction between the preload applying member 70 and a counterpart member coming into contact with the preload applying member 70. As described above, wear on the preload applying member 70 can be further suppressed.

Further, for example, in the hydraulic pump 200 illustrated in FIG. 4, the preload applying member 70 came into contact with the outer race 61. Instead of this, a structure in which the preload applying member 70 abuts against the inner race 62 as in a hydraulic pump 250 illustrated in FIG. 5 may be adopted. In this case, the inner race 62 of the support part 65 on the side of the bearing part 60A is externally fitted to the rotary shaft 20 by a clearance fit. As a result, the preload applying member 70 presses the inner race 62 toward the rear, while being supported by the housing 10. Accordingly, a preload is applied to the outer race 61 and the inner race 62.

In the hydraulic pump 250 according to the modified example illustrated in FIG. 5, the support part 65 is interposed between the preload applying member 70 and the first annular member 71A in the axial direction. Among the inner race 62 and the outer race 61, the inner race 62, which is a member on the side against which the preload applying member 70 abuts, is attached to the rotary shaft 20 by a clearance fit. With such a configuration, the preload applying member 70 can apply the preload by abutting against the inner race 62 of the support part 65. Further, the high-speed rotation associated with the rotary shaft 20 of the support part 65 which is a counterpart member of the preload applying member 70 is suppressed by the interposition of the first annular member 71A. Further, in such a configuration, since the support part 65 is interposed between the preload applying member 70 and the rotary shaft 20 in addition to the first annular member 71A, the rotation of the rotary shaft 20 is prevented from being transmitted to the preload applying member 70 as it is. The first annular member 71A coming into contact with the receiving part 21A with the high-speed rotation of the rotary shaft 20 and the support part 65 coming into contact with the first annular member 71A rotate together, but the number of revolutions of the rotation is suppressed as compared with the number of revolutions of the rotary shaft 20. Therefore, the number of revolutions of the preload applying member 70 coming into contact with the support part 65 is also suppressed as compared with the number of revolutions of the rotary shaft 20. As a result, it is possible to suppress wear on the preload applying member 70 due to friction between the preload applying member 70 and a counterpart member coming into contact with the preload applying member 70. As described above, wear on the preload applying member 70 can be further suppressed.

For example, in the above embodiment, the variable displacement type piston pump is exemplified as an example of a hydraulic pump, but the invention is not limited thereto. For example, the bearing structure of the present invention may be applied to various hydraulic pumps such as fixed displacement type piston pumps, gear pumps, and vane pumps.

Further, in FIGS. 2 to 5, the preload applying member 70 is provided in the bearing part 60A on the front end side, but in place thereof, the preload applying member 70 may be provided in the bearing part 60B on the rear end side. Further, the preload applying member 70 may be provided in both the bearing part 60A on the front end side and the bearing part 60B on the rear end side.

Further, the configuration of the preload applying member 70 is not limited to the shape illustrated in the above embodiment, and may have a shape like a coil spring.

REFERENCE SIGNS LIST

1, 150, 200, 250 . . . hydraulic pump, 20 . . . rotary shaft, 60A, 60B . . . bearing part, 65 . . . support part, 70 . . . preload applying member, 71A, 71B . . . annular member, 100 . . . bearing structure.

The invention claimed is:

1. A hydraulic pump having a rotary shaft rotatably supported with respect to a casing, the hydraulic pump comprising:
   a bearing part provided to one end side and the other end side of the rotary shaft; and
   a first annular member provided around the rotary shaft on at least one side of the one end side and the other end side of the rotary shaft,
   wherein the bearing part on the one side has:
      a support part which rotatably supports the rotary shaft, and
      a preload applying member which applies a preload in the axial direction to the support part,
   the first annular member is interposed between the bearing part of the one side and a receiving part of the rotary shaft in the axial direction, and
   an inner diameter of the first annular member is larger than a diameter of the rotary shaft.

2. The hydraulic pump according to claim 1, wherein the support part has an inner race attached to the rotary shaft, an outer race attached to a housing, and a rolling element disposed between the inner race and the outer race,
   the preload applying member is interposed between the support part and the first annular member in the axial direction, and
   among the inner race and the outer race, a member on a side against which the preload applying member abuts is attached to the rotary shaft or the housing by a clearance fit.

3. The hydraulic pump according to claim 1, wherein the support part has an inner race attached to the rotary shaft, an outer race attached to a housing, and a rolling element disposed between the inner race and the outer race,
   the support part is interposed between the preload applying member and the annular member in the axial direction, and
   among the inner race and the outer race, a member on a side against which the preload applying member abuts is attached to the rotary shaft or the housing by a clearance fit.

4. The hydraulic pump according to claim 1, further comprising:
   a second annular member which is provided around the rotary shaft and is opposed to the bearing part in the axial direction, on the other side of the one end side and the other end side of the rotary shaft, and
   the inner diameter of the second annular member is larger than the outer diameter of the rotary shaft.

* * * * *